(12) United States Patent
Garton et al.

(10) Patent No.: US 9,454,732 B1
(45) Date of Patent: Sep. 27, 2016

(54) ADAPTIVE MACHINE LEARNING PLATFORM

(71) Applicant: Amazon Technologies, Inc., Reno, NV (US)

(72) Inventors: Lian R. Garton, Seattle, WA (US); Luhui Hu, Bothell, WA (US)

(73) Assignee: Amazon Technologies, Inc., Reno, NV (US)

( * ) Notice: Subject to any disclaimer, the term of this patent is extended or adjusted under 35 U.S.C. 154(b) by 172 days.

(21) Appl. No.: 13/683,378

(22) Filed: Nov. 21, 2012

(51) Int. Cl.
*G06F 15/18* (2006.01)
*G06N 99/00* (2010.01)

(52) U.S. Cl.
CPC .................................. *G06N 99/005* (2013.01)

(58) Field of Classification Search
None
See application file for complete search history.

(56) References Cited

U.S. PATENT DOCUMENTS

| | | | | |
|---|---|---|---|---|
| 6,226,627 B1* | 5/2001 | Polak | | 706/14 |
| 6,871,345 B1* | 3/2005 | Crow | | G06F 8/67 709/203 |
| 7,882,045 B1* | 2/2011 | Cole | | G06N 99/005 706/12 |
| 7,882,046 B1* | 2/2011 | Kizhakkekalathil | | G06N 99/005 706/12 |
| 7,937,336 B1* | 5/2011 | Maynard-Zhang | | H04L 29/1299 706/12 |
| 8,352,389 B1* | 1/2013 | Martinez | | G06N 99/005 706/12 |
| 8,364,613 B1* | 1/2013 | Lin | | G06N 7/005 700/65 |
| 8,793,201 B1* | 7/2014 | Wang | | G06F 17/30569 706/13 |
| 2003/0069782 A1* | 4/2003 | Chrisman et al. | | 705/10 |
| 2003/0120372 A1* | 6/2003 | Ruth et al. | | 700/108 |
| 2006/0047617 A1* | 3/2006 | Bacioiu | | G06K 9/6262 706/59 |
| 2007/0067404 A1* | 3/2007 | Brown et al. | | 709/206 |
| 2008/0091519 A1* | 4/2008 | Foss | | 705/10 |
| 2009/0205040 A1* | 8/2009 | Zunke | | G06F 21/10 726/14 |
| 2009/0248687 A1* | 10/2009 | Su | | G06F 17/30533 |
| 2009/0259509 A1* | 10/2009 | Landvater | | G06Q 10/06315 705/7.31 |
| 2009/0260160 A1* | 10/2009 | Landvik | | G09B 25/00 5/618 |
| 2009/0299988 A1* | 12/2009 | Hamilton | | G06F 17/30702 |
| 2009/0319346 A1* | 12/2009 | Fogel et al. | | 705/11 |

(Continued)

*Primary Examiner* — Kakali Chaki
*Assistant Examiner* — Viker Lamardo
(74) *Attorney, Agent, or Firm* — Lee & Hayes, PLLC

(57) ABSTRACT

Some examples include receiving data from a source external to an adaptive machine learning platform that includes at least one machine learning component. Some implementations may execute a machine learning component to generate a machine learning component output. The machine learning component output may be generated at least in part based on the received data. A command may be generated based at least in part on the machine learning component output, and the command may be communicated to an action plugin. The action plugin manager may be used to configure one or more parameters of an action representing an automated workflow to be executed by the action plugin in response to receiving the command.

30 Claims, 11 Drawing Sheets

(56) References Cited

U.S. PATENT DOCUMENTS

| | | | | |
|---|---|---|---|---|
| 2009/0327172 A1* | 12/2009 | Liu | | G06N 99/005 706/12 |
| 2010/0010869 A1* | 1/2010 | Faure et al. | | 705/10 |
| 2010/0057719 A1* | 3/2010 | Kulkarni | | G06F 17/30864 707/E17.108 |
| 2010/0177956 A1* | 7/2010 | Cooper | | G06K 9/0064 382/159 |
| 2010/0191599 A1* | 7/2010 | Vaidyanathan et al. | | 705/14.49 |
| 2011/0004935 A1* | 1/2011 | Moffie | | G06F 21/53 726/23 |
| 2011/0141913 A1* | 6/2011 | Clemens | | H04L 41/0681 370/242 |
| 2011/0153523 A1* | 6/2011 | DuBois | | 705/36 R |
| 2011/0191768 A1* | 8/2011 | Smith | | G06F 9/445 717/176 |
| 2011/0225636 A1* | 9/2011 | Keith | | G06Q 10/10 726/7 |
| 2011/0264665 A1* | 10/2011 | Mital | | G06F 17/30867 707/741 |
| 2011/0264678 A1* | 10/2011 | Mital | | G06F 17/30867 707/759 |
| 2011/0282861 A1* | 11/2011 | Bergstraesser | | G06F 17/30507 707/710 |
| 2011/0295823 A1* | 12/2011 | Sathish | | G06F 17/30294 707/705 |
| 2011/0302553 A1* | 12/2011 | Gulwani | | G06F 9/44 717/107 |
| 2012/0215640 A1* | 8/2012 | Ramer | | G06F 17/30867 705/14.55 |
| 2012/0324348 A1* | 12/2012 | Rounthwaite | | G06F 17/211 715/256 |
| 2013/0103686 A1* | 4/2013 | Sisneros | | G06F 17/30867 707/736 |

* cited by examiner

US 9,454,732 B1

ADAPTIVE MACHINE LEARNING PLATFORM

BACKGROUND

Managing the sale of items "offline" (e.g., via a third party brick-and-mortar retail partner) may require human knowledge and manual processes due to the nature of being offline. However, such manual processes can be time consuming and costly. In addition, it can be difficult to be accurate or correct for making a business decision. For example, there may be a lack of enough information for a human to make the right decision, or there may be a large amount of data that may be difficult to process in a timely manner.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure includes techniques and arrangements for a data-driven and adaptive machine learning (ML) platform for an offline retail business. As one example, a framework herein may enhance an offline retail business to make efficient, low-cost, and precise decisions. The adaptive ML platform may enable multiple machine learning (ML) algorithms to be executed for various purposes for supporting offline retail sales. In some examples, the ML platform may include a plurality of ML components, each associated with an ML algorithm. For instance, an ML component may be a component that utilizes one or more trained (or otherwise configured) ML algorithms that receive empirical data (e.g., data stored in one or more databases) to determine patterns or predictions that may be features of an underlying mechanism that generated the data. The ML component may be able to utilize observed examples (e.g., from a set of training data) to capture characteristics of interest which may correspond to an unknown underlying probability distribution. The training data associated with observed examples can be employed as instances of the possible relations between observed variables. However, the set of all possible behaviors given all possible inputs may be too large to be included in the training data. As such, an ML component may further generalize from the examples in the training data in order to produce an output.

In some implementations, the adaptive machine learning system of the present disclosure may allow an offline retail operations team or an offline retail business team to conveniently update decision-making strategies. In some examples, "offline retail" may include providing an item (e.g., an electronic device such as electronic book reader device) to a third-party brick-and-mortar retail partner for sale to a customer. The item may also be sold directly to the customer via an e-commerce site. For example, "offline retail" sales may represent only a portion of the total sales of the item.

Figure 1:
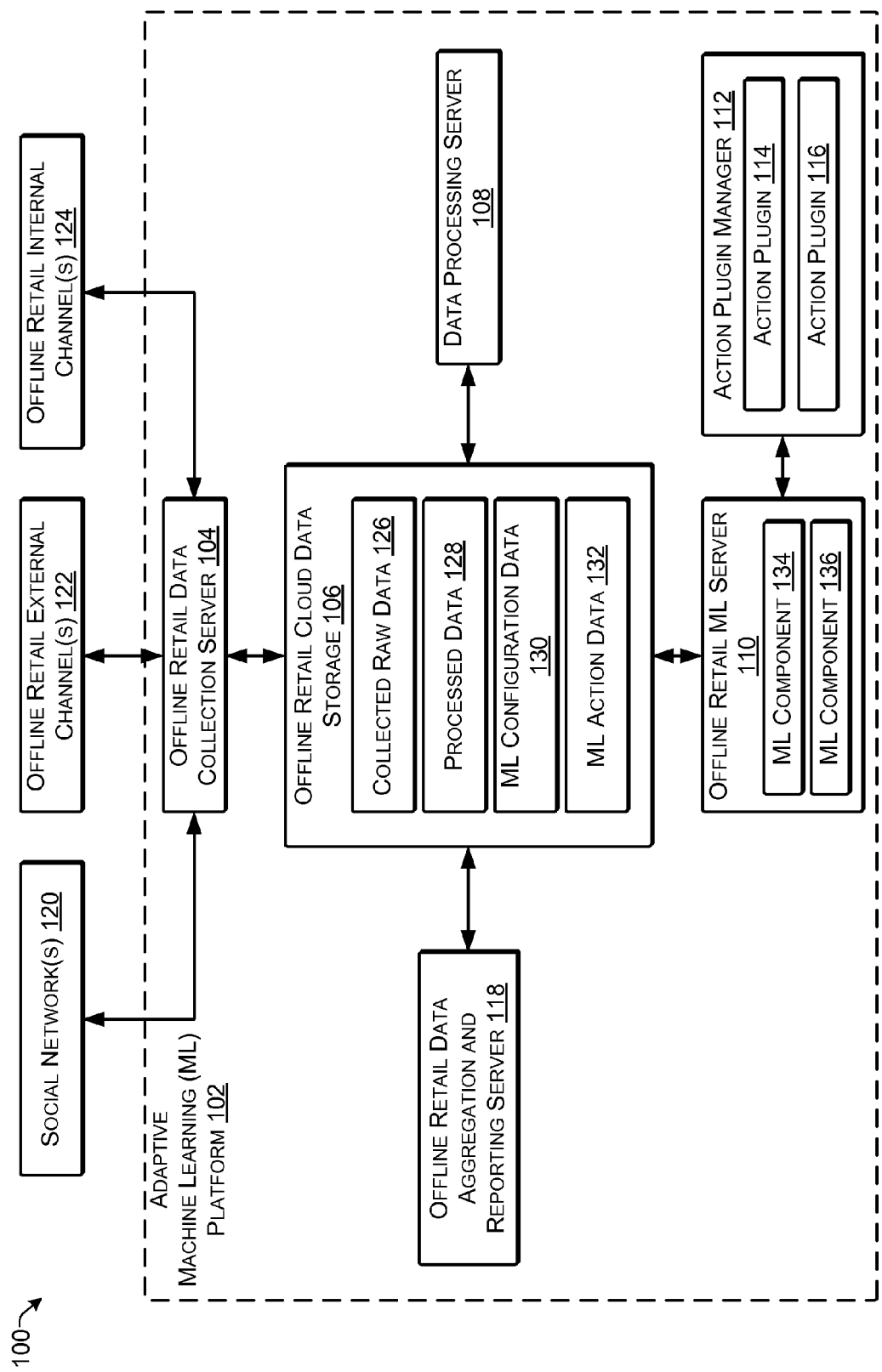
FIG. 1 illustrates an example framework for an adaptive machine learning platform according to some implementations.

FIG. 1 illustrates an example framework of a system 100 according to some implementations. The system 100 includes an adaptive machine learning (ML) platform 102. The adaptive ML platform 102 includes an offline retail data collection server 104, an offline retail cloud data storage 106, a data processing server 108, an offline retail ML server 110, and an action plugin manager 112 associated with at least one action plugin. An action representing an automated workflow may be executed by an action plugin. One or more parameters associated with the action representing the automated workflow may be configurable via the action plugin manager 112. While two action plugins 114, 116 are shown in FIG. 1, it will be appreciated that this is for illustrative purposes only. The adaptive ML platform 102 also includes an offline retail data aggregation and reporting server 118.

The adaptive ML platform 102 may be configured to allow implementation of artificial intelligence (AI) functions, simplification of processes, and automation of workflows associated with the "offline retail" portion of an organization's business. In the system 100 of FIG. 1, the ML platform 102 is "adaptive" or "pluggable," in that the platform 102 and the algorithms may be managed independently. Typically, a software development engineer team would own and build an automated workflow system based on input from a business team, and the business team would own the associated algorithms. This approach requires that both teams be involved for each change and implementing a new AI tool. In the system 100 of the present disclosure, the business team can own or control both the algorithms and function extensions. As such, the business team may add a new algorithm or change an existing algorithm without the need to involve the software development engineer team. Further, business owners can "plug" and "unplug" function extensions. As an illustrative example of a pluggable function extension, an onboarding team may utilize different models for different geographic regions. For instance, the onboarding team may employ a North American model to bring on a new retailer in North America. Instead of using the same model for onboarding a new European retailer, the onboarding team may have another model plug in for the platform, extending an algorithm that applies to the North American market to the European market.

The offline retail data collection server 104 is configured to collect data from one or more channels outside of the adaptive ML platform 102. For instance, in some examples, the offline retail data collection server 104 collects and crawls data from one or more social networks 120, one or more offline retail external channels 122, and one or more offline retail internal channels 124. To illustrate, the data from the one or more social networks 120 may include customer experience data. Such data may be useful for a customer experience study that may allow the offline retailer to provide updated device settings (e.g., software updates, automatic page turn speed, etc.) or content (e.g., demonstration device content) to improve the customer experience. The data from the one or more offline retail external channels 122 may include manufacturer data, retailer data (e.g., data from one or more retail partners), demonstration device sales data, customer-viewed demonstration device content, among other alternatives. According to some implementations, an application program interface (API) may allow for automatic collection of the retailer data, such as a number of devices received by a particular retailer and a number of devices currently in stock. For demand planning, such information may be useful in determining how many devices the retailer sells at a particular location (e.g., at a particular store, in a particular geographical area, etc.). The data from the one or more offline retail internal channels 124 may include financial service data, device return/refund information, data warehouse information, etc. According to some implementations, at least a portion of this data may be associated with the "online" portion of the organization's business. As online device sales may represent a significant portion of the organization's business, a large amount of existing data may be available to the offline retail data collection server 104.

The data processing server 108 is configured to process the data received from the offline retail data collection server 104. For example, a large amount of data may be collected by the offline retail data collection server 102, and the data processing server 108 may index or otherwise organize the data for use by the offline retail machine learning server 110 and the offline retail data aggregation and reporting server 118.

The offline retail cloud data storage 106 is configured to store collected raw data 126 (e.g., data collected by the offline retail data collection server 104) and processed data 128 (e.g., indexed data from the data processing server 108). The offline retail cloud data storage 106 is further configured to store machine learning configuration data 130 and machine learning action data 132.

The offline retail machine learning server 110 is configured to execute multiple ML components that are each associated with a particular machine-learning algorithm. Each ML component may be trained or otherwise configured to provide a different type of machine learning component output. It will be appreciated that the term "machine-learning algorithm" may include multiple types of algorithms and is not intended to be limited to a particular type of algorithm. While two ML components 134, 136 are shown in FIG. 1, it will be appreciated that this is for illustrative purposes only (see e.g., the multiple ML components illustrated in FIG. 2). A user may connect to the offline retail ML server 110 to load an algorithm via a portal (not shown), and the associated algorithm information may be stored at the offline retail cloud data storage 106.

The action plugin manager 112 may be a program, module or other executable code configured to connect to multiple ML components of the adaptive ML platform 102 to establish a workflow. For example, one or more teams may utilize the action plugin manager 112 to manage how the different ML components interact with each other. For example, in FIG. 1, the action plugin manager 112 may connect with the ML components 134 and 136 on the offline retail ML server 110. According to some implementations, the action plugin manager 112 may connect to one or more ML components in order to invoke one or more other ML components.

The action plugin manager 112 is further configured to automate one or more offline retail operations and functions by automatically executing one or more actions representing automated workflows. An operations team may provide the adaptive ML platform 102, while a business team may provide the model. A business team associated with a particular model may add one or more action plugins (e.g., action plugins 114, 116) via the action plugin manager 112 in order to execute one or more commands generated by the offline retail ML server 110. The action plugin manager 112 may execute an action based on a particular ML algorithm that may be defined and managed by a particular team. If an algorithm received via the action plugin manager 112 includes a syntax error, the adaptive ML platform 102 itself may determine the error and identify a corrective action for the operations team.

The one or more actions may be associated with one or more commands that are generated by the offline retail ML server 110. As an illustrative example, an action may include replying to a customer email automatically. To illustrate, a customer may purchase an electronic book reader device at a price that is higher than a subsequent sales price. The customer email may indicate that the customer would like to return the device for a refund and purchase another device at the reduced price. The action plugin manager 112 may automatically reply to the customer email indicating to the customer that the customer should keep the device, and the offline retailer will refund the difference to the customer automatically. For example, an action plugin associated with an automated email reply action may include an email template, and one or more configurable parameters identified in the email template may be selectively defined by a user in order to generate the automatic reply.

The offline retail data aggregation and reporting server 118 is configured to provide metrics and/or reports (not shown) based on the data stored at the offline retail cloud data storage 106. To illustrate, a management team may be interested in high level metrics and/or reports but may not be interested in algorithm details, etc. By aggregating data at the offline retail could data storage 106, such metrics may be more readily obtained.

In the adaptive ML platform 102, there can be many independent or dependent machine learning components. Each ML component can run as a standalone ML system under the adaptive ML platform 102 and may be pluggable. This modular design may offer flexibility in planning and implementation to different teams. For example, an operations team may manage and configure its own operations ML component, which may or may not use output data from other teams who own and manage other different ML components. Thus, the operations team may train their own ML component based on training data supplied by the operations team for managing their own operations and procedures. In addition, output data from the operations ML component can be used as input data by other ML components that are owned by other teams. According to some implementations, the operations team may manage and configure its own operations ML component, a marketing team may manage and configure its own demand planning ML component, an onboarding team may manage and configure its own new retailer smart setup ML component, a customer experience team may manage and configure its own customer experience study ML component, and a demonstration operation team can manage and configure its own demonstration operation ML component. These ML components can have their own specific configurations and purposes, such as based on training data for each team's respective operations and procedures, but are stored and adaptively managed by the adaptive ML platform 102 as a group. Thus, each ML component can use downstream data from other ML components and can share upstream data together seamlessly. Further, the ML components can generate the results in real-time to meet dynamic and high-demand business needs. These ML components may be connected adaptively like a tree diagram or data structure. However, the tree data structure may not be a static tree structure. Rather, the ML components may interact with each other adaptively. This adaptive tree structure platform is different from a traditional machine learning system, which may only be configured with a batch of components in a list.

Figure 2:
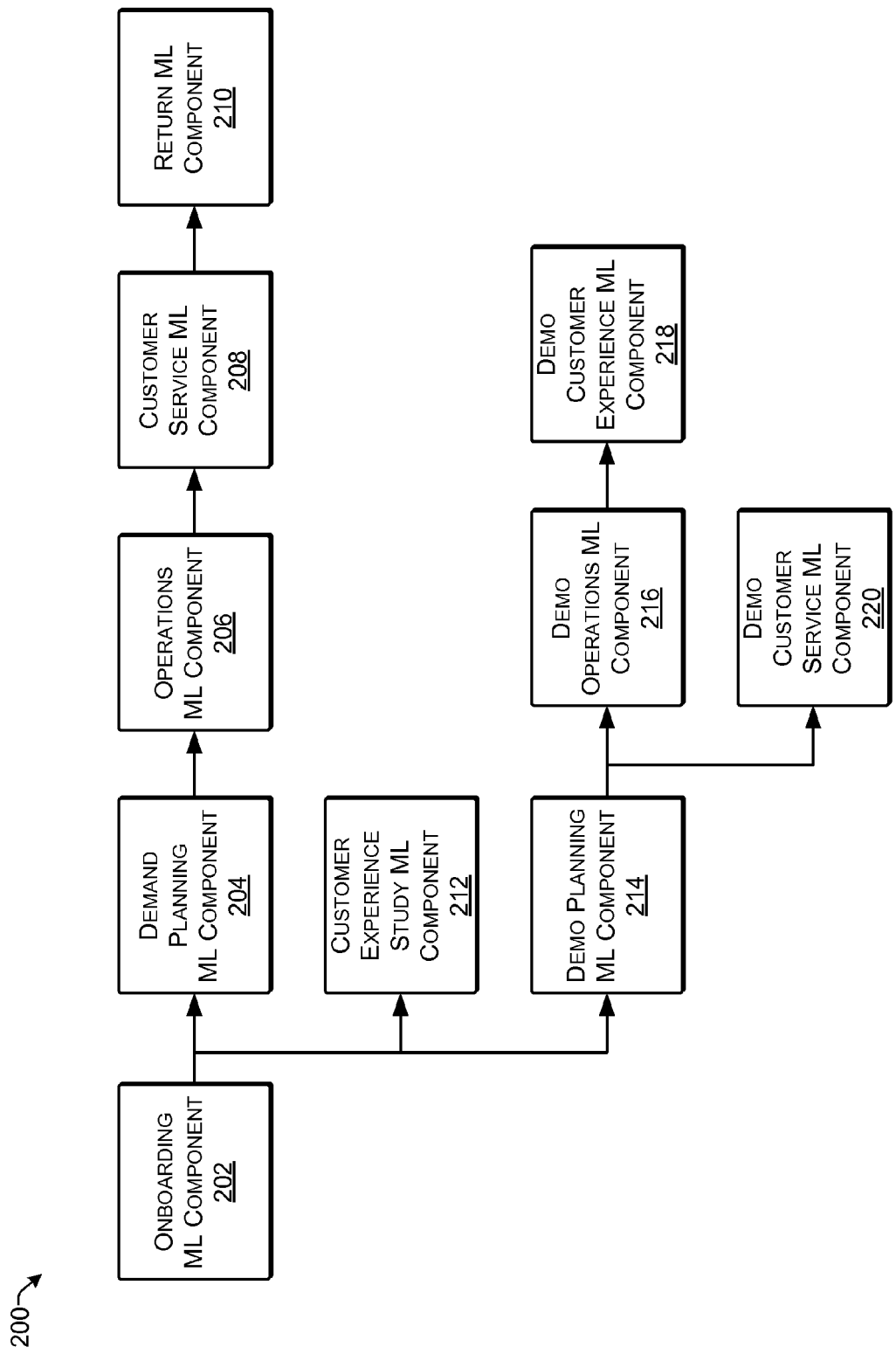
FIG. 2 illustrates an example of interaction of multiple machine learning components of an adaptive machine learning platform according to some implementations.

FIG. 2 is a block diagram to illustrate the adaptive nature of the ML platform 102 of FIG. 1 and is generally designated 200. As noted above with regard to FIG. 1, the offline retail ML server 110 may include multiple ML components (e.g., ML components 134, 136). In the adaptive ML platform 102 of FIG. 1, the ML components 134, 136 can be independent or dependent machine learning components. Each ML component may run as a standalone ML system under the adaptive ML platform 102 and may be "pluggable." This modular design may provide the offline retailer flexibility with respect to planning and implementation.

There may be multiple "teams," such as business teams, that are associated with different business functions or services. As illustrative examples, such teams may include an onboarding team, a demand planning team, an operations team, a customer service team, a return team, a customer experience team, a demonstration team, among other alternatives. FIG. 2 illustrates that multiple teams or services may not be independent. Rather, there may be relationships between teams or services, and the adaptive ML platform 102 of the present disclosure may allow for adaptive management of the ML components of the related teams or services.

FIG. 2 illustrates an onboarding ML component 202, a demand planning ML component 204, an operations ML component 206, a customer service ML component 208, and a return ML component 210. FIG. 2 further illustrates a customer experience study ML component 212, a demonstration planning ML component 214, a demonstration operations ML component 216, a demonstration customer experience ML component 218, and a demonstration customer service ML component 220.

The onboarding ML component 202 may output data based on a machine learning algorithm managed and configured by an onboarding team (e.g., a business unit that is associated with initially partnering with a retailer). The onboarding ML component 202 may utilize data collected by the offline retail data collection server 104 and stored at the offline retail cloud data storage 106. That is, data stored at the offline retail cloud data storage 106 may represent input empirical data for a machine learning algorithm configured by a particular group of an offline retailer. In this case, the ML configuration data 130 may include algorithm configuration information received from the onboarding team. According to some implementations, the input data includes the processed data 128 (e.g., data that is indexed or otherwise organized by the data processing server 108). Alternatively, the input data may include the collected raw data 126, or a combination of the collected raw data 126 and the processed data 128. Thus, the onboarding ML component 202 may represent a configurable machine learning algorithm that may identify patterns or predictions associated with data collected from at least one source external to the adaptive ML platform 102.

In the example illustrated in FIG. 2, the onboarding ML component 202 shares data (e.g., output data from the machine learning algorithm owned or controlled by the onboarding team) with the demand planning ML component 204. The demand planning ML component 204 may output data based on a machine learning algorithm that is managed and configured by a demand planning team that is different from the onboarding team. Thus, in the example illustrated in FIG. 2, the machine learning algorithm configured by the demand planning team may utilize not only data collected by the offline retail data collection server 104 and stored at the offline retail cloud data storage 106, but also output data from the machine learning algorithm configured by the onboarding team.

The demand planning ML component 204 shares data with the operations ML component 206, which shares data with the customer service ML component 208, which shares data with the return ML component 210. The operations ML component 206, the customer service ML component 208, and the return ML component 210 may each be managed and configured by different teams. Thus, the operations ML component 206, the customer service ML component 208, and the return ML component 210 may each utilize not only data collected by the offline retail data collection server 104 and stored at the offline retail cloud data storage 106, but also utilize output data from a machine learning algorithm configured by another team.

As an example of data sharing, a return team associated with the return ML component 210 may manage returns of devices to a retailer. It may be difficult for the return team to determine the number of devices that are being returned at any given time. For example, customers may purchase devices from a particular retailer, and all devices returned to that particular retailer may be centralized at a warehouse and subsequently returned in bulk. As another example, the customer may bypass the retailer where the device was purchased and return the device directly, such as via mail. Each device may be associated with a particular device serial number (DSN) for tracking purposes. In both cases, information from other machine learning components, such as a customer service ML component 208 or a retail partner ML component (not shown) may be useful to the return team in determining the number of devices that are being returned at any given time.

FIG. 2 further illustrates that the onboarding ML component 202 also shares data with the customer experience study ML component 212 and the demonstration planning ML component 214. The demonstration planning ML component 214 shares data with the demonstration operations ML component 216 and the demonstration customer service ML component 220. The demonstration operations ML component 216 shares data with the demonstration customer experience ML component 218.

It should be noted that each ML component or model may originate from the same team or from a different team. For example, demonstration planning and demonstration operations may be associated with the same team. As such, the demonstration planning ML component 214 and the demonstration operations ML component 216 may be managed by the same team. As another example, both the customer service ML component 208 and the demonstration customer service ML component 220 may be managed by the same team.

Figure 3:
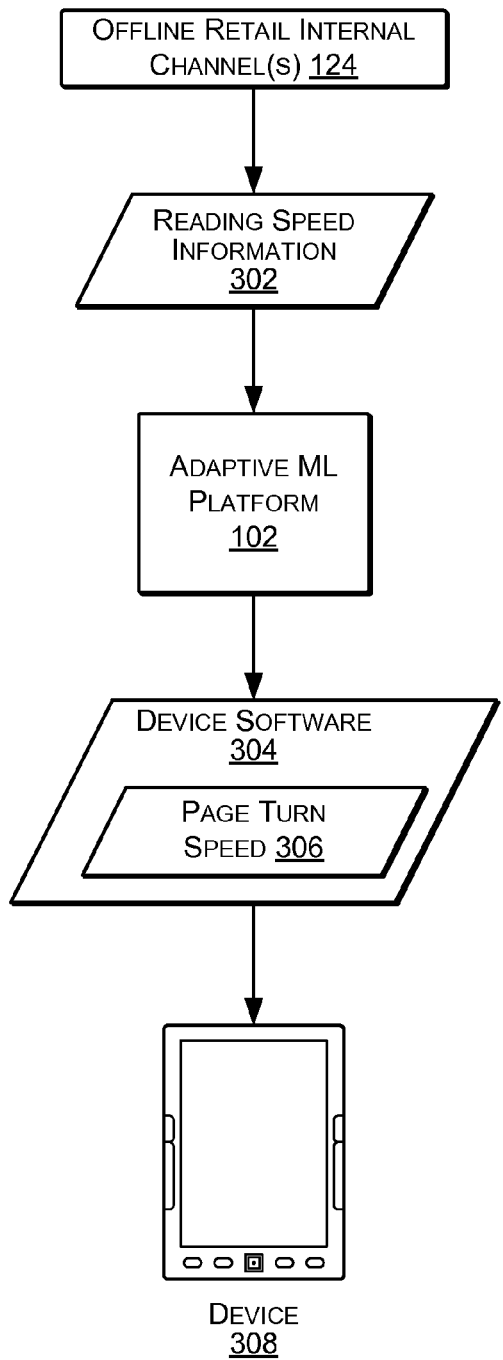
FIG. 3 illustrates an example of a use case associated with an adaptive machine learning platform according to some implementations.

Referring to FIG. 3, an example use case is illustrated and generally designated 300. FIG. 3 illustrates that information collected by the adaptive ML platform 102 from the one or more offline retail internal channels 124 may be used to adjust device settings of a device (e.g., an electronic book reader device).

In the example illustrated in FIG. 3, the one or more offline retail internal channels 124 may provide reading speed information 302 to the adaptive ML platform 102. Based on this information, the adaptive ML platform 102 may provide device software 304, including a page turn speed 306 (e.g., a frequency of page turns or the time between page turns), to a device 308. In this way, the adaptive ML platform 102 could provide information to the device 308, allowing pages to be turned automatically according to a predicted page turn speed. Thus, a user of the device 308 may no longer need to use a button or tap a screen to move to the next page. Instead, the page would automatically move to the next one after providing a calculated amount of time for the user to read the page. According to some implementations, the device 308 may include a demonstration device provided to a retailer for customer demonstration. In this case, the reading speed information 302 may include a reading speed of an average user. Alternatively, the device 308 may be a device that has been purchased from the retailer by a customer, and the page turn speed 306 may be determined for the customer after registration of the device 308. Thus, the adaptive ML platform 102 may automatically adjust one or more device settings in order to improve the customer experience (e.g., the demonstration device experience or the "out of box" experience).

Figure 4:
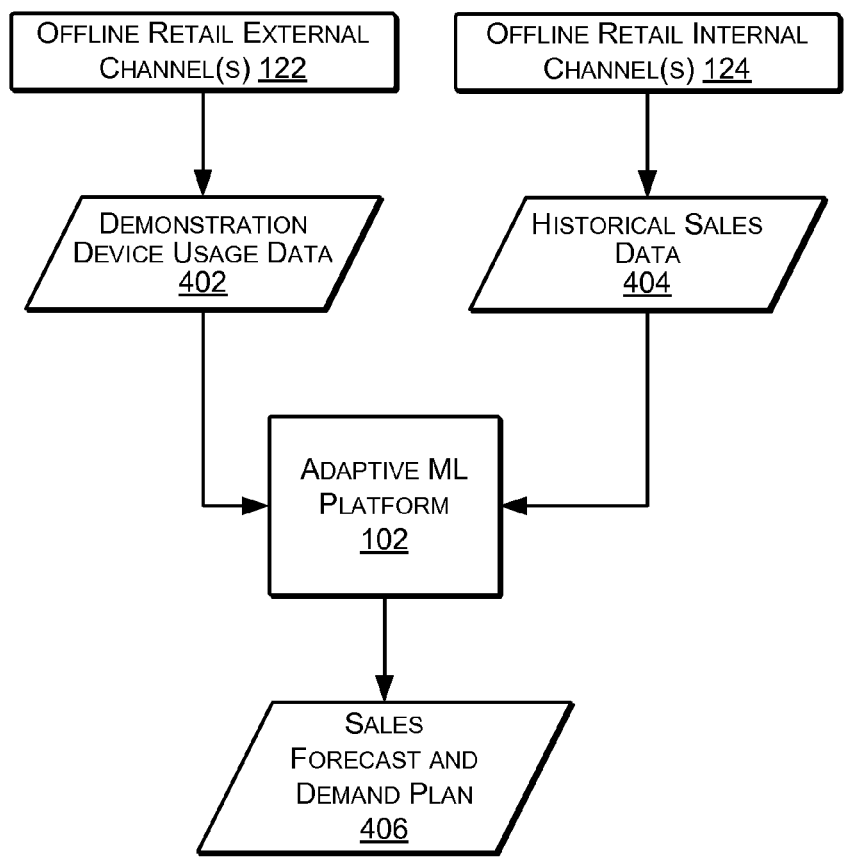
FIG. 4 illustrates an example of a use case associated with an adaptive machine learning platform according to some implementations.

Referring to FIG. 4, an example use case is illustrated and generally designated 400. FIG. 4 illustrates that information collected by the adaptive ML platform 102 from the one or more offline retail external channels 122 and from the one or more offline retail internal channels 124 may be used for sales forecasting and demand planning.

In the example illustrated in FIG. 4, the one or more offline retail external channels 122 may provide demonstration device usage data 402 to the adaptive ML platform 102. Further, the one or more offline retail internal channels 124 may provide historical sales data 404 to the adaptive ML platform 102. For example, the historical sales data 404 may include historical offline retail sales data, online retail sales data, or a combination thereof. Based on this information, the adaptive ML platform 102 may provide a sales forecast and demand plan 406. For example, the sales forecast and demand plan 406 may include a forecast of device sales at one or more retailer locations. As there are numerous steps from manufacturing a device to delivery of the device to an end user, an accurate sales forecast and a precise demand plan may result in cost savings, increased offline retail revenue, or both.

Figure 5:
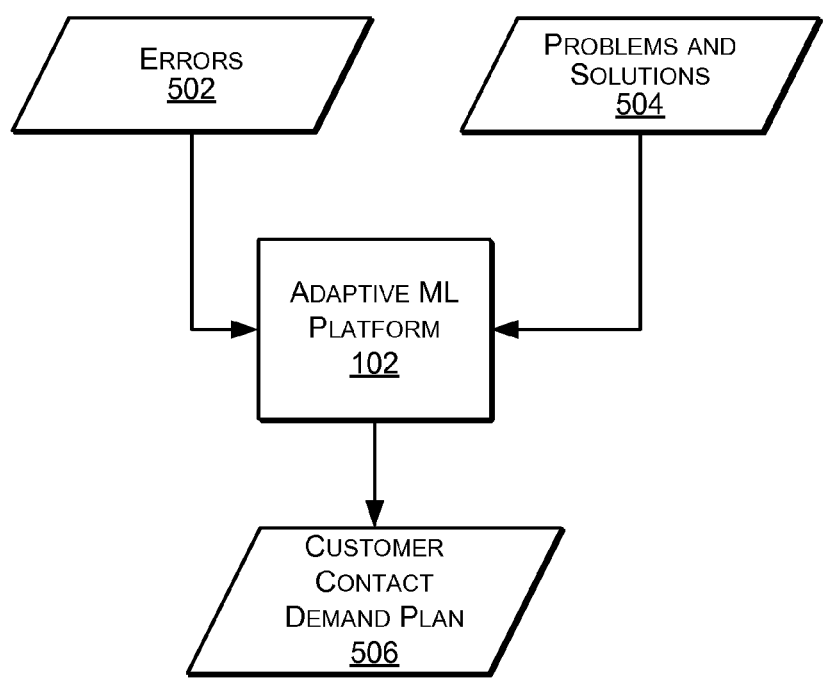
FIG. 5 illustrates an example of a use case associated with an adaptive machine learning platform according to some implementations.

Referring to FIG. 5, an example use case is illustrated and generally designated 500. FIG. 5 illustrates that information collected by the adaptive ML platform 102 may be used for customer contact demand planning.

Once a customer purchases a device, he or she may have questions or issues. Typically, multiple channels (e.g. via email, phone, or chat) may be available to provide a solution to the customer. Typically, a majority of solutions are provided via an automated system, not by a customer service representative. However, with regard to customer service representatives, not every representative can answer every problem or question. In better supporting customer service, the adaptive ML platform 102 may employ artificial intelligence to allocate the coming customer contacts and automatically answer or process contacts 406. Using data gathered on errors 502 that users have encountered or common problems and solutions 504, the adaptive ML platform 102 may produce a customer contact demand plan 506. For example, the adaptive ML platform 102 may receive an identified solution to a problem previously encountered by a user, and the customer contact demand plan 506 may include a plan for how to respond to a customer with the identified solution.

Figure 6:
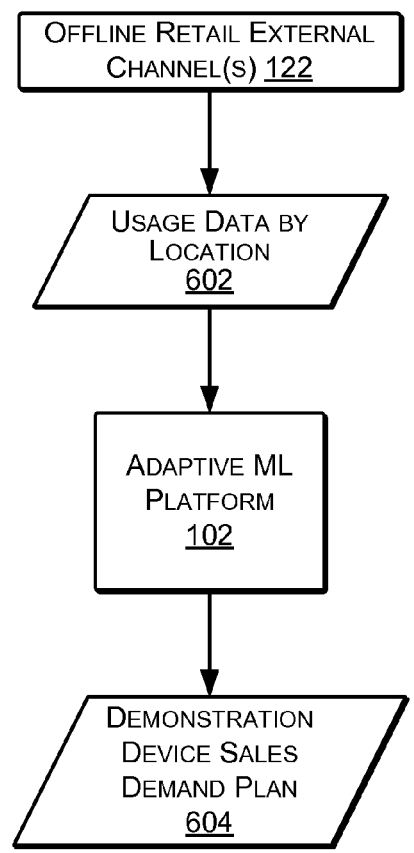
FIG. 6 illustrates an example of a use case associated with an adaptive machine learning platform according to some implementations.

Referring to FIG. 6, an example use case is illustrated and generally designated 600. FIG. 6 illustrates that information collected by the adaptive ML platform 102 from the one or more offline retail external channels 122 with regard to usage of demonstration devices by location may be used for demonstration device sales demand planning.

In some cases, demonstration devices are not provided to a retailer for free. Rather, the retailer may pay a fee for the demonstration devices. As with a demand plan for sales to customers, the adaptive ML platform 102 may produce a demonstration device sales demand plan for launching new devices and onboarding new retailers. Based on usage data by location 602, the adaptive ML platform 102 may predict the amount of traffic produced by a new demonstration device in a similar location. The predicted amount of traffic may be used to automatically generate a demonstration device sales demand plan 604. That is, demonstration device usage data may be used to generate a forecast of demonstration device demand (e.g., at a particular retailer location or at multiple retailer locations).

Figure 7:
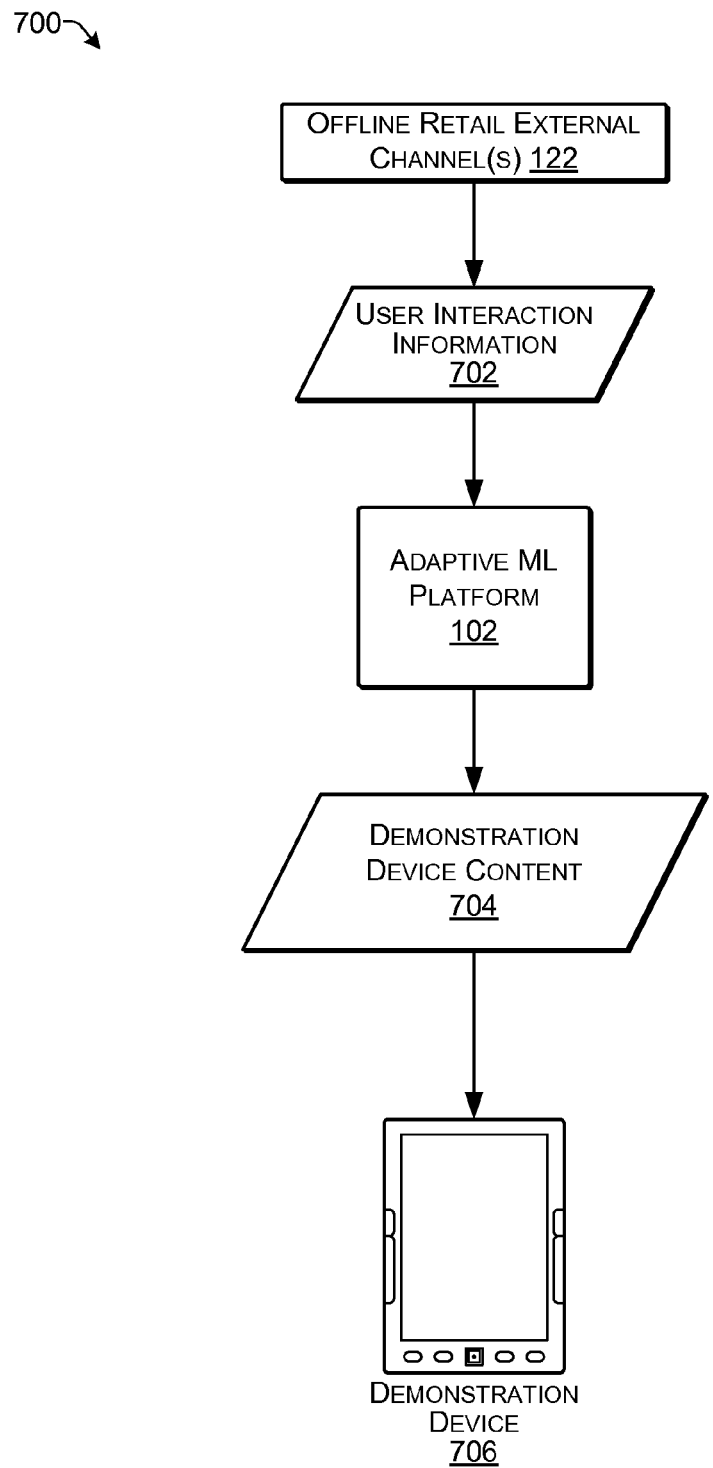
FIG. 7 illustrates an example of a use case associated with an adaptive machine learning platform according to some implementations.

Referring to FIG. 7, an example use case is illustrated and generally designated 700. FIG. 7 illustrates that information collected by the adaptive ML platform 102 from the one or more offline retail external channels 122 may be used to dynamically update content of a demonstration device (e.g., an electronic book reader device).

Demonstration devices in retail stores may not be replaced often. However, updating the content on a demonstration device may make improve the customer experience, thereby making the device more desirable for purchase. As such, the adaptive ML platform 102 may be used to dynamically update the content of a demonstration device according to locations, holiday seasons and other conditions. Based on user interaction information 702 associated with existing content, the adaptive ML platform 102 may select the proper content for delivery to a particular location or to a particular demonstration device. As shown in FIG. 7, demonstration device content 704 may be provided by the adaptive ML platform 102 to a demonstration device 706 (e.g., via a wireless network connection).

While not illustrated in FIG. 7, the adaptive ML platform 102 could also associate user content preferences with basic personal information entered by the user and/or data gathered from a picture/video of the user (provided the demonstration device 706 has a camera). The data association may be used to update the demonstration device content in substantially real-time to provide a customized demonstration device experience. As an illustrative example, if the data shows that customers wearing pink usually select a particular magazine to read, then the top listed item on the demonstration device 706 could change to that magazine when the camera detected a large amount of pink in the foreground.

Figure 8:
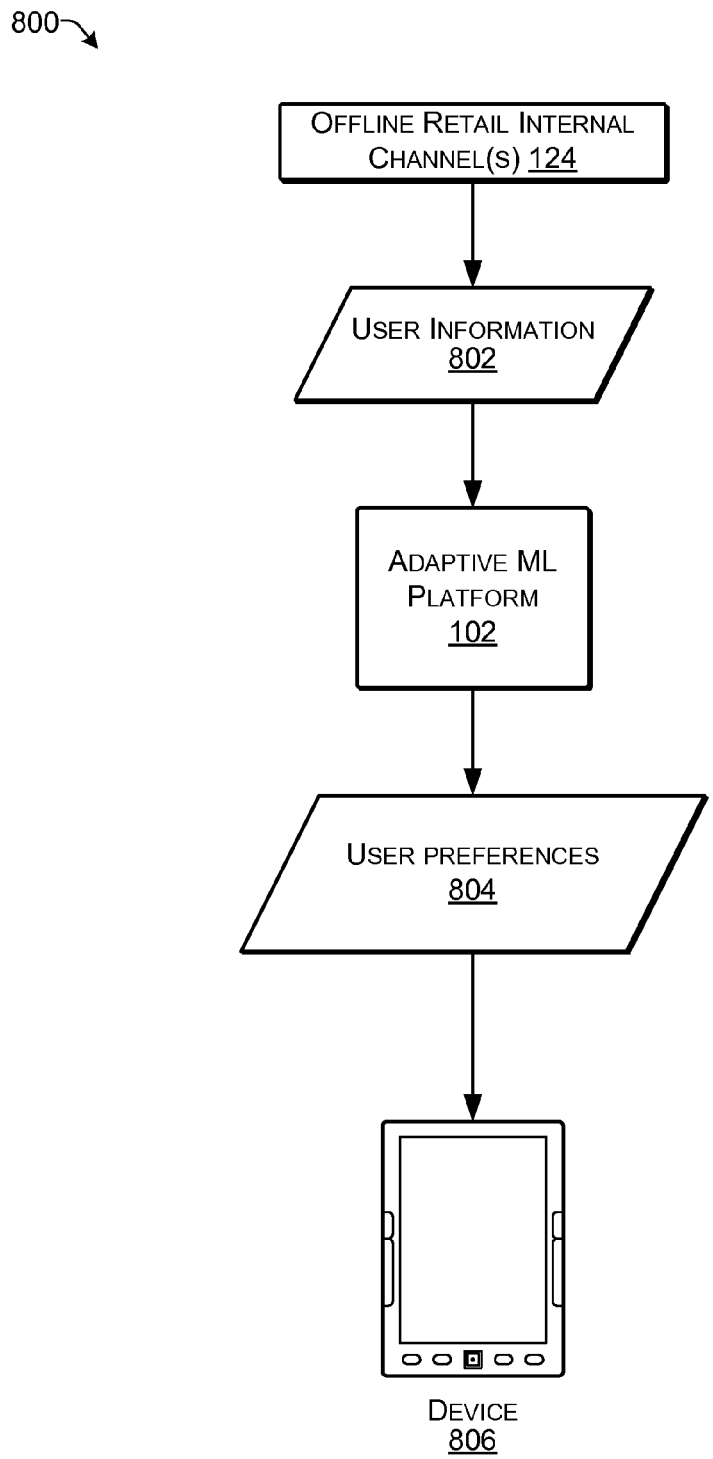
FIG. 8 illustrates an example of a use case associated with an adaptive machine learning platform according to some implementations.

Referring to FIG. 8, an example use case is illustrated and generally designated 800. FIG. 8 illustrates that information collected by the adaptive ML platform 102 from the one or more offline retail internal channels 124 may be used to update default preferences on a device upon device registration, in order to provide an improved "out of box" experience.

When a customer purchases a device (e.g., an electronic book reader device), the device is configured based on default preferences. For an electronic book reader device, the preferences may include font style, font size, voice volume, etc. However, each customer may have different expectations or preferences (e.g., book reading, movie watching). As an illustrative example, younger users may have different tastes than older users. As another example, users on the West Coast may have different desires than users on the East Coast. Upon registration, user information 802 may be provided to the adaptive ML platform 102 in order to identify user preferences 804 to be sent to a device 806 in order to improve the "out of box" experience.

Figure 9:
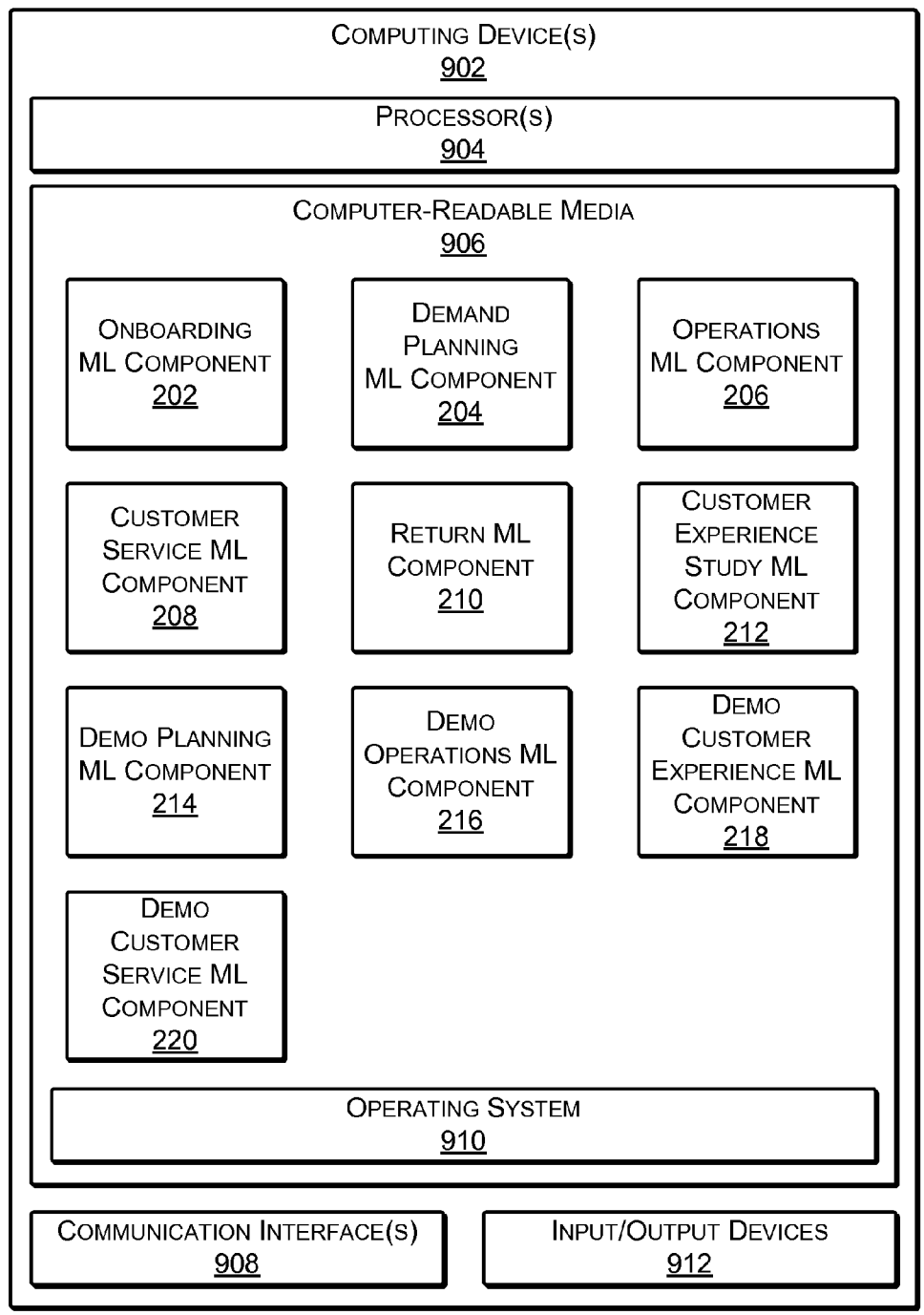
FIG. 9 illustrates select components of one or more example computing devices according to some implementations.

FIG. 9 illustrates select components of one or more computing devices 902 that may be used to implement the functionality described herein according to some implementations. The computing device(s) 902 may include one or more servers or other types of computing devices that may be embodied in any number of ways. For instance, in the case of a server, the computing device(s) 902 may be a single server, a cluster of servers, a server farm or data center, a cloud hosted computing service, and so forth, although other computer architectures (e.g., a mainframe architecture) may also be used. Further, while the figures illustrate the components of the computing device 902 as being present in a single location, it is to be appreciated that these components may be distributed across different computing devices and locations in any manner. Generally, the computing device 902 may be implemented by one or more computing devices, with the various functionality described above distributed in various ways across the different computing devices. The computing devices may be located together or separately, and organized, for example, as virtual servers, server banks and/or server farms. The described functionality may be provided by the computing devices of a single entity or enterprise, or may be provided by the computing devices and/or services of multiple entities or enterprises.

As illustrated in FIG. 9, an example computing device 902 includes one or more processors 904, one or more computer-readable media 906, and one or more communication interfaces 908. The processor(s) 904 may be a single processing unit or a number of processing units, and may include single or multiple computing units or multiple cores. The processor(s) 904 can be configured to fetch and execute computer-readable instructions stored in the computer-readable media 906 or other computer-readable media. According to some implementations, the computing device 902 may correspond to the offline retail ML server 110 of FIG. 1, and the processor(s) 904 may fetch and execute computer-readable instructions stored at the offline retail cloud data storage 106.

The computer-readable media 906 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 902, the computer-readable media 906 may be a type of computer storage media and may be a non-transitory storage media.

The computer-readable media 906 may be used to store any number of functional components that are executable by the processors 904. In many implementations, these functional components comprise instructions or programs that are executable by the processors 904 and that, when executed, implement operational logic for performing the actions attributed above to the computing device 902. Functional components of the computing device 902 that may be executed on the processors 904 for implementing the various functions and features described herein, include the onboarding ML component 202, the demand planning ML component 204, the operations ML component 206, the customer service ML component 208, the return ML component 210, the customer experience study ML component 212, the demonstration planning ML component 214, the demonstration operations Ml component 216, the demonstration customer experience ML component 218, and the demonstration customer service ML component 220 illustrated in FIG. 2. Additional functional components stored in the computer-readable media 906 may include an operating system 910 for controlling and managing various functions of the computing device 902.

In addition, the computer-readable media 906 may include, or the computing device 902 may access data (e.g., via the communication interfaces 908) the collected raw data 126, the processed data 128, the ML configuration data 130, and the ML action data 132 stored at the offline retail cloud data storage 106. In addition, the computing device(s) 902 may include many other logical, programmatic and physical components, of which those described above are merely examples that are related to the discussion herein.

The communication interface(s) 908 may include one or more interfaces and hardware components for enabling communication with various other devices over one or more network(s). For example, communication interface(s) 908 may facilitate communication through one or more of the Internet, cable networks, cellular networks, wireless networks (e.g., Wi-Fi, cellular) and wired networks. Various different approaches to implementations described herein can be implemented in various environments. For instance, the network(s) may include any appropriate network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

Computing device 902 may further be equipped with various input/output devices 912. Such I/O devices 912 may include a display, various user interface controls (e.g., buttons, mouse, keyboard, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 10:
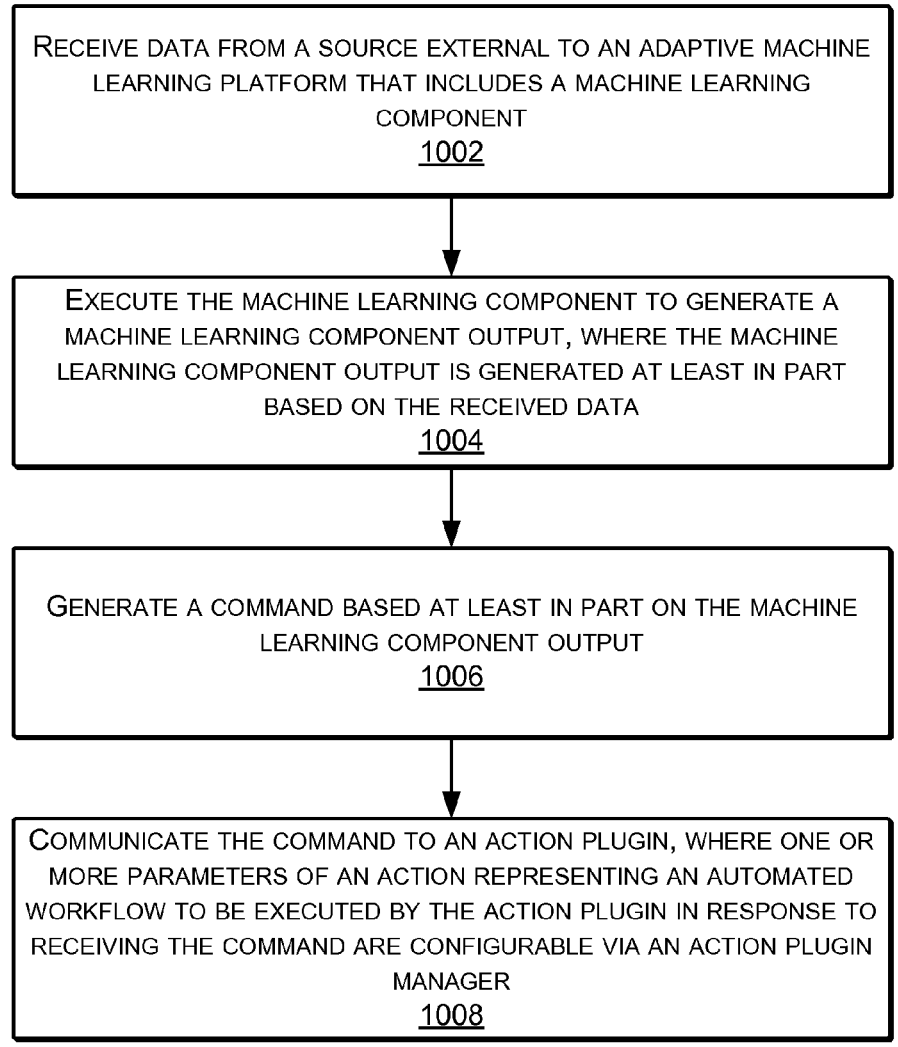
FIG. 10 is a flow diagram illustrating an example process to determine an action to be executed based on a machine learning component output according to some implementations.
Figure 11:
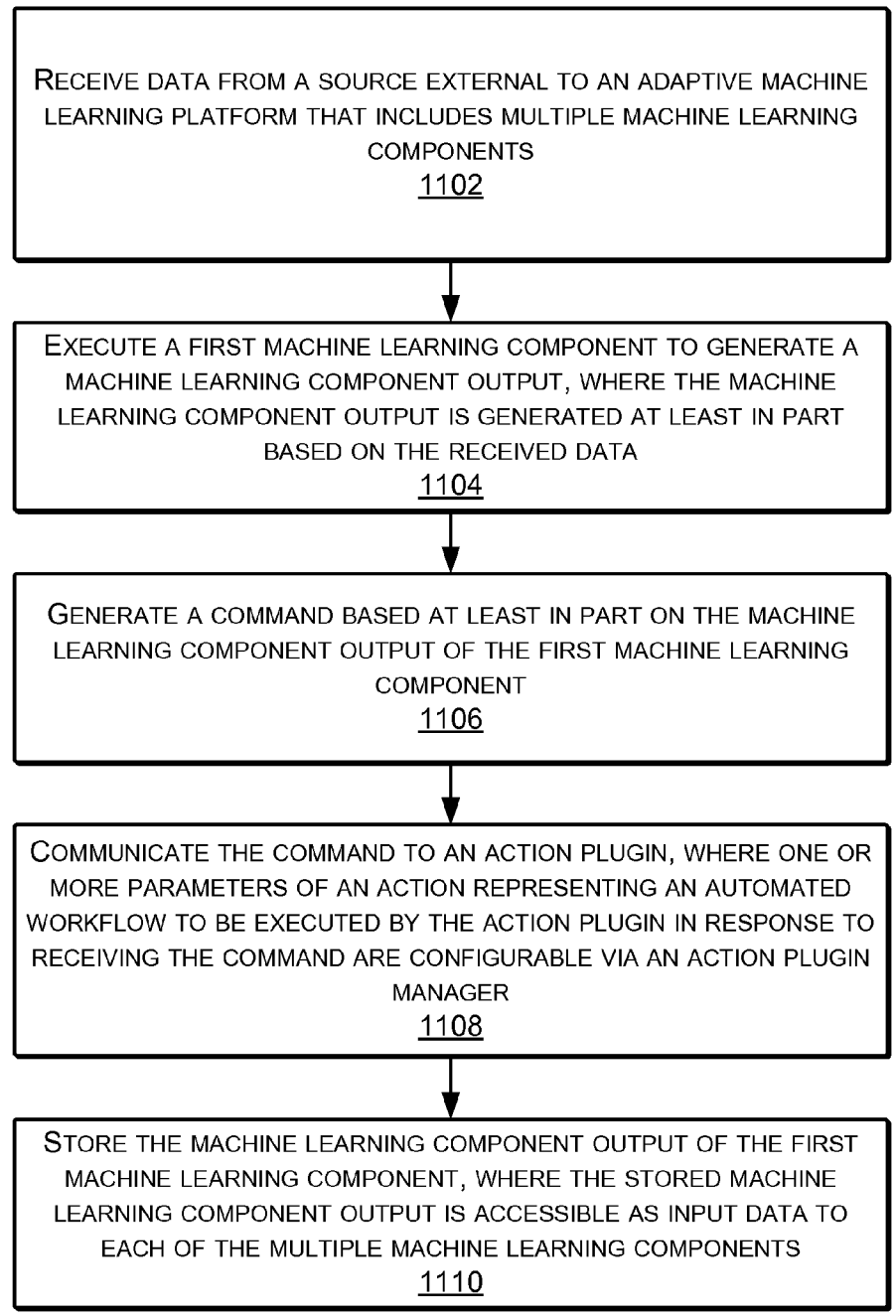
FIG. 11 is a flow diagram illustrating an example process to determine an action to be executed based on a machine learning component output according to some implementations.

FIGS. 10 and 11 are flow diagrams illustrating example processes to identify one or more actions to be executed based on a machine learning component output according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

The processes of FIGS. 10 and 11 are just possible examples of techniques for identifying or more actions to be executed based on a machine learning component output. Accordingly, implementations herein are not limited to the specific examples shown and described. In some examples, the processes of FIGS. 10 and 11 may be executed by one or more computing devices, such as one or more computing devices of an offline retailer, or other entity, executing the ML components 134, 136 or 202-220 discussed above, or other suitable computer code.

Referring to FIG. 10, at 1002, the computing device may receive data from a source external to an adaptive machine learning platform that includes a machine learning component. For example, the computing device may include the offline retail ML server 110 of the adaptive ML platform 102 of FIG. 1, and the multiple machine learning components may include the machine learning components 134, 136 stored on the offline retail ML server 110. The source external to the adaptive ML platform 102 may include at least one of the one or more social networks 120, the one or more offline retail external channels 122, or the one or more offline retail internal channels 124.

At 1004, the computing device executes the machine learning component to generate a machine learning component output. The machine learning component output is generated at least in part based on the received data. For example, the offline retail ML server 110 may generate the machine learning component output.

At 1006, the computing device generates a command based at least in part on the machine learning component output. At 1008, the computing device may communicate the command to an action plugin. For example, the offline retail ML server 110 of FIG. 1 may communicate the command to the action plugin 114. One or more parameters of an action representing an automated workflow to be executed by the action plugin 114 in response to receiving the command may be configurable via the action plugin manager 112.

Referring to FIG. 11, at 1102, a computing device may receive data from a source external to an adaptive machine learning platform that includes multiple machine learning components. For example, the received data may include customer experience data, manufacturer data, retailer data, demonstration device sales data, demonstration device usage data, financial data, return data, data warehouse data, or a combination thereof (among other alternatives).

At 1104, the computing device may execute a first machine learning component of the multiple machine learning components to generate a machine learning component output. The machine learning component output may be generated at least in part based on the received data.

At 1106, the computing device generates a command based at least in part on the machine learning component output of the first machine learning component. At 1108, the computing device communicates the command to an action plugin. An action representing an automated workflow may be executed by the action plugin in response to receiving the command. One or more parameters associated with the action may be configurable via an action plugin manager.

At 1110, the computing device stores the machine learning component output of the first machine learning component. The stored machine learning component output is accessible as input data to each of the multiple machine learning components.

According to some implementations, the computing device may execute a second machine learning component of the multiple machine learning components to generate a second machine learning component output. The second machine learning component output may be generated at least in part based on the stored machine learning component output of the first machine learning component. According to some implementations, the second machine learning component is further determined based on the received data. The computing device may generate a second command based at least in part on the second machine learning component output and communicate the second command to a second action plugin (e.g., the action plugin 116 of FIG. 1). A second action representing a second automated workflow may be executed by the action plugin 116 in response to receiving the second command. One or more parameters associated with the second action may be configurable via the action plugin manager 112.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
   under control of one or more processors configured with executable instructions, receiving data from a source external to an adaptive machine learning platform that includes multiple machine learning components, wherein the received data comprises at least one of customer experience data, manufacturer data, retailer data, demonstration device sales data, demonstration device usage data, financial data, return data, or data warehouse data;

executing a first machine learning component of the multiple machine learning components to generate a machine learning component output, wherein the machine learning component output is generated at least in part based on the received data;

generating, based at least in part on the machine learning component output of the first machine learning component, a command configured to cause an action plugin to perform an action representing an automated workflow that is associated with the first machine learning component;

communicating the command to the action plugin, wherein, in response to the action plugin receiving the command, one or more parameters of the action representing the automated workflow to be executed by the action plugin are configurable via an action plugin manager;

causing the action representing the automated workflow to be performed based at least in part on the one or more parameters configured via the action plugin manager in response to communicating the command; and storing the machine learning component output of the first machine learning component, wherein the stored machine learning component output is accessible as input data to at least a second machine learning component of the multiple machine learning components, the second machine learning component being different than the first machine learning component.

2. The method as recited in claim 1, further comprising:
executing the second machine learning component of the multiple machine learning components to generate a second machine learning component output, wherein the second machine learning component output is generated at least in part based on the received data and the stored machine learning component output of the first machine learning component;

generating a second command based at least in part on the second machine learning component output; and communicating the second command to a second action plugin, wherein, in response to the second action plugin receiving the second command, one or more parameters of a second action representing a second automated workflow to be executed by the second action plugin are configurable via the action plugin manager.

3. The method as recited in claim 1, wherein the source external to the adaptive machine learning platform comprises at least one of:
one or more social networks;
one or more offline retail external channels; or
one or more offline retail internal channels.

4. The method as recited in claim 1, wherein training data that is used by a business team to train the first machine learning component is accessible to one or more other business teams via the adaptive machine learning platform to train the second machine learning component.

5. The method as recited in claim 1, wherein the multiple machine learning components comprise at least one of:
an onboarding machine learning component;
a demand planning machine learning component;
an operations machine learning component;
a customer service machine learning component;
a return machine learning component;
a customer experience machine learning component;
a demonstration planning machine learning component;
a demonstration operations machine learning component;
a demonstration customer experience machine learning component; or
a demonstration customer service machine learning component.

6. A method comprising:
under control of one or more processors configured with executable instructions,
receiving data from a source external to an adaptive machine learning platform that includes a first machine learning component;

executing the first machine learning component to generate a machine learning component output, wherein the machine learning component output is generated at least in part based on the received data;

storing the machine learning component output of the first machine learning component, the stored machine learning component output being accessible as input data for at least a second machine learning component, the second machine learning component being different than the first machine learning component;

generating, based at least in part on the machine learning component output, a command configured to cause an action plugin to perform an action associated with the first machine learning component;

communicating the command to the action plugin, wherein, in response to the action plugin receiving the command, one or more parameters of the action representing an automated workflow to be executed by the action plugin are configurable via an action plugin manager; and causing the action representing the automated workflow to be performed based at least in part on the one or more parameters configured via the action plugin manager in response to communicating the command.

7. The method as recited in claim 6, wherein the adaptive machine learning platform further includes at least the second machine learning component, and wherein the method further comprises executing the second machine learning component to generate a second machine learning component output based at least in part on the received data.

8. The method as recited in claim 7, wherein the second machine learning component is configured to provide a different type of machine learning component output than the first machine learning component.

9. The method as recited in claim 6, wherein:
the received data includes at least reading speed information;
the machine learning component output includes a page turn speed; and
the action includes communicating the page turn speed to a device.

10. The method as recited in claim 6, wherein:
the received data includes at least demonstration device usage data and historical sales data; and
the machine learning component output includes a forecast of device sales at one or more retailer locations.

11. The method as recited in claim 6, wherein:
the received data includes an identified solution to a problem previously encountered by a user; and
the machine learning component output includes a customer contact demand plan to respond to a customer with the identified solution.

12. The method as recited in claim 6, wherein:
the received data includes at least demonstration device usage data; and
the machine learning component output includes a forecast of demonstration device demand.

13. The method as recited in claim 6, wherein:
the received data includes at least user interaction information associated with a demonstration device; and
the machine learning component output includes updated demonstration device content to be communicated to the demonstration device.

14. The method as recited in claim 6, wherein:
the received data includes at least user information determined upon registration of a device; and
the machine learning component output includes updated user device preferences that are different from default device preferences of the device.

15. The method as recited in claim 14, wherein the device includes an electronic book reader device.

16. The method as recited in claim 6, wherein the action representing the automated workflow includes automatically communicating a message to a customer.

17. The method as recited in claim 6, wherein the source external to the adaptive machine learning platform includes one or more social networks.

18. The method as recited in claim 6, wherein the source external to the adaptive machine learning platform includes one or more offline retail external channels.

19. The method as recited in claim 6, wherein the received data includes at least one of:
manufacturing data;
retailer data;
demonstration device data; or
customer review data.

20. The method as recited in claim 6, wherein the source external to the adaptive machine learning platform includes one or more offline retail internal channels.

21. The method as recited in claim 6, wherein the received data includes at least one of:
financial data;
return data; or
data warehouse data.

22. The method as recited in claim 6, wherein a plurality of action plugins are managed via the action plugin manager.

23. One or more non-transitory computer-readable media maintaining instructions executable by one or more processors to perform operations comprising:
receiving data from a source external to an adaptive machine learning platform that includes at least a first machine learning component and a second machine learning component, wherein the first machine learning component is independent from the second machine learning component and is configured to generate a different type of machine learning output than the second machine learning component;
executing a first algorithm associated with the first machine learning component of the multiple machine learning components to generate a first machine learning component output, wherein the first machine learning component output is generated at least in part based on the received data;
generating, based at least in part on the first machine learning component output, a command configured to cause an action plugin to perform an action associated with the first machine learning component;
communicating the command to the action plugin, wherein, in response to the action plugin receiving the command, one or more parameters of the action representing an automated workflow to be executed by the action plugin are configurable via an action plugin manager;
causing the action representing the automated workflow to be performed based at least in part on the one or more parameters configured via the action plugin manager in response to communicating the command; and
storing the first machine learning component output, wherein the first machine learning component output is accessible as input data to at least a second algorithm associated with the second machine learning component.

24. The one or more non-transitory computer-readable media as recited in claim 23, wherein:
the first machine learning component is associated with a first business team of a plurality of business teams; and
the second machine learning component is associated with a second business team of the plurality of business teams.

25. The one or more non-transitory computer-readable media as recited in claim 23, wherein the source external to the adaptive machine learning platform comprises at least one of:
one or more social networks;
one or more offline retail external channels; or
one or more offline retail internal channels.

26. The one or more non-transitory computer-readable media as recited in claim 23, wherein the first and second machine learning components comprise at least one of:
an onboarding machine learning component;
a demand planning machine learning component;
an operations machine learning component;
a customer service machine learning component;
a return machine learning component;
a customer experience machine learning component;
a demonstration planning machine learning component;
a demonstration operations machine learning component;
a demonstration customer experience machine learning component; or
a demonstration customer service machine learning component.

27. A system comprising:
one or more processors;
one or more computer-readable media; and
one or more modules maintained on the one or more computer-readable media that, when executed by the one or more processors, cause the one or more processors to perform operations including:
receiving data from multiple sources that are external to an adaptive machine learning platform that includes at least a first machine learning component and a second machine learning component, the first machine learning component being independent of the second machine learning component and is configured to generate a different type of machine learning output than the second machine learning component;
executing a first algorithm associated with the first machine learning component of the multiple machine learning components to generate a first machine learning component output, wherein the first machine learning component output is generated at least in part based on the received data;
generating, based at least in part on the first machine learning component output, a command configured to cause an action plugin to perform an action associated with the first machine learning component;

communicating the command to the action plugin, wherein, in response to the action plugin receiving the command, one or more parameters of the action representing an automated workflow to be executed by the action plugin are configurable via an action plugin manager;

causing the action representing the automated workflow to be performed based at least in part on the one or more parameters configured via the action plugin manager in response to communicating the command; and storing the first machine learning component output of the first machine learning component, wherein the first machine learning component output is accessible as input data to a second algorithm associated with the second machine learning component.

28. The system as recited in claim 27, wherein the multiple sources external to the adaptive machine learning platform comprise at least one of:
one or more social networks;
one or more offline retail external channels; or
one or more offline retail internal channels.

29. The system as recited in claim 27, wherein each of the first and second machine learning components is associated with at least one business team of a plurality of business teams.

30. The system as recited in claim 27, wherein the second machine learning component output is further generated based on the received data.

* * * * *